(12) United States Patent
Reynders

(10) Patent No.: US 7,241,090 B2
(45) Date of Patent: Jul. 10, 2007

(54) COLLECTING TROUGH FOR A MACHINE TOOL

(75) Inventor: Luc Reynders, Riemst (BE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/331,061

(22) Filed: Jan. 13, 2006

(65) Prior Publication Data
US 2006/0163822 A1 Jul. 27, 2006

(30) Foreign Application Priority Data
Jan. 26, 2005 (DE) .................. 20 2005 001 316 U

(51) Int. Cl.
 B23Q 11/00 (2006.01)
 B23Q 1/03 (2006.01)
 B23Q 1/01 (2006.01)
(52) U.S. Cl. .................. 409/135; 409/137; 409/235; 408/234; 29/DIG. 94; 29/DIG. 102; 29/DIG. 101; 108/24; 108/25
(58) Field of Classification Search ........ 409/134–137, 409/235; 29/DIG. 101, DIG. 102, DIG. 94; 74/608–609; 451/451, 453, 455–456; 108/24–25, 108/27; 408/234, 56, 67
See application file for complete search history.

(56) References Cited

U.S. PATENT DOCUMENTS

| 1,926,997 | A | * | 9/1933 | Hoelscher et al. ... 29/DIG. 101 |
| 3,090,284 | A | * | 5/1963 | Dunning ...................... 409/134 |
| 4,955,770 | A | * | 9/1990 | Kitamura ..................... 409/134 |
| 5,113,558 | A | * | 5/1992 | Soroka et al. .............. 409/137 |
| 6,116,616 | A |   | 9/2000 | Bratten |
| 6,662,685 | B2 | * | 12/2003 | Kuriki et al. ................ 409/134 |
| 7,044,693 | B2 | * | 5/2006 | Fujiwara ..................... 409/137 |
| 7,165,919 | B2 | * | 1/2007 | Schweizer et al. .......... 409/137 |
| 2003/0021647 | A1 | * | 1/2003 | Groitl et al. ................. 409/137 |
| 2006/0045641 | A1 | * | 3/2006 | Anderson et al. ........... 409/137 |

FOREIGN PATENT DOCUMENTS

| EP | 949044 A2 * | 10/1999 |
| JP | 57-149135 A * | 9/1982 |
| WO | WO-02/22273 A1 * | 3/2002 |

OTHER PUBLICATIONS

Printout from www.thefreedictionary.com defining "buna rubber", printed on Feb. 28, 2007.*
Printout from Merriam-Webster Online defining "foam", printed on Feb. 21, 2007.*
Printout from International Rubber Products Exhibition, article titled "Products: Microcellular Rubber", two pages, printed Feb. 21, 2007.*
Printout regarding Viton, cover page heading "Specify Viton fluoroelastomers for Superior Sealing Performance in a wide variety of aggressive applications", from DuPont, copyright 2005, 8 pages.*

* cited by examiner

Primary Examiner—Erica Cadugan
(74) Attorney, Agent, or Firm—Crowell & Moring LLP

(57) ABSTRACT

An open-topped collection trough for arrangement under a machine tool to collect downwardly flowing coolant emitted from coolant spray nozzles of the machine tool which direct coolant jets onto cutting tools and adjacent surfaces, in which the collection trough is provided with a height adjusting mechanism and a seal system made of foam seal material between the top edge at the side of the trough and the undersurfaces of a machine tool to seal the gap between the trough and the tool.

5 Claims, 3 Drawing Sheets

COLLECTING TROUGH FOR A MACHINE TOOL

BACKGROUND OF THE INVENTION

The present invention relates to an open-topped collection trough for arrangement under a machine tool to collect downwardly flowing coolant emitted from coolant spray nozzles of the machine tool which direct coolant jets onto cutting tools and adjacent surfaces.

A machine tool having the aforementioned features is disclosed in U.S. Pat. No. 6,116,616 (=EP 949,044). This machine tool, which is used to machine workpieces through chip removal, has a plurality of coolant spray nozzles. As workpieces are machined, both the coolant jets and the chips entrained by the coolant jets must be removed. To this end, a collection trough is disposed underneath the machine tool to collect the coolant and the chips. A transport mechanism located in or underneath the collection trough is adapted to feed coolant and chips to filtration equipment. To prevent coolant from escaping through gaps between the machine tool and the collection trough and to prevent chips from reaching the environment outside the collection trough, the collection trough has an inflatable seal, disposed between the top edges at the sides of the trough and the undersurfaces of the machine tool. To adapt the contours of the machine tool, the seal may be inflated to varying degrees.

A drawback of this system is that an auxiliary agent in the form of compressed air is required to inflate the seal and produce the sealing action. Furthermore, it is necessary to ensure that the inflatable sealing member is not damaged during operation of a machine tool, which would allow the air to escape.

SUMMARY OF THE INVENTION

It is an object of the present invention to provide an improved coolant collecting trough for a machine tool.

A further object is to provide a coolant collecting trough for a machine tool which does not require an auxiliary medium to provide a seal between the trough and the bottom of the machine tool.

Another object is to provide a coolant collecting trough for a machine tool with a seal which can adapt to varying contours of the machine tool.

It is also an object of the invention to provide a coolant collecting trough for a machine tool with a seal which will not lose its entire effectiveness if only a small section is damaged.

These and other objects are achieved in accordance with the present invention by providing a collecting trough for arrangement underneath a machine tool to collect coolant from the machine tool, wherein the collecting trough is open toward the top and is provided with a height adjusting mechanism and has at least one seal member made of foam seal material arranged along a top edge at the side of the trough for contacting an undersurface of the machine tool and sealing gaps between the trough and the machine tool.

Thus, the collecting trough constructed in accordance with the invention has, between the top edges of the sides of the trough and the undersurfaces of a machine tool, a seal system made of a foam seal material to seal the gaps between the trough and the machine, and the collection trough also has a trough height adjusting mechanism.

An advantage of the invention is that no additional auxiliary medium is required to achieve a reliable seal of the collection trough to the machine tool. In addition, different heights or shoulders and structures of the machine tool may be compensated by adapting the foam seal material, i.e., giving it a certain configuration, so that a reliable seal is ensured.

In a further refinement, the height adjusting mechanism of the collection trough is hydraulic or mechanical. The height adjusting mechanism is preferably arranged at the bottom of the collection trough, but it is also possible to provide a height adjusting mechanism in the seal region. For example, the height adjustment may be effected using an expandable bellows.

In yet another refinement, the collection trough is moveably arranged underneath the machine tool, so that it can also be removed for cleaning outside the machine tool.

In yet another refinement, the foam seal material is a nitrile or butadiene rubber which has a closed-cell structure, provides a good seal and is highly elastic. The foam seal material is water absorbent. The rubber material preferably has a density within the range from 100 to 300 kg/m.sup.3. A circumferential strip or surface, such as a sheet metal flange, against which the foam seal material is seated, is provided on the machine tool. This sealing surface of this strip or surface extends in a single plane and can thus compensate for different height profiles of the machine tool.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
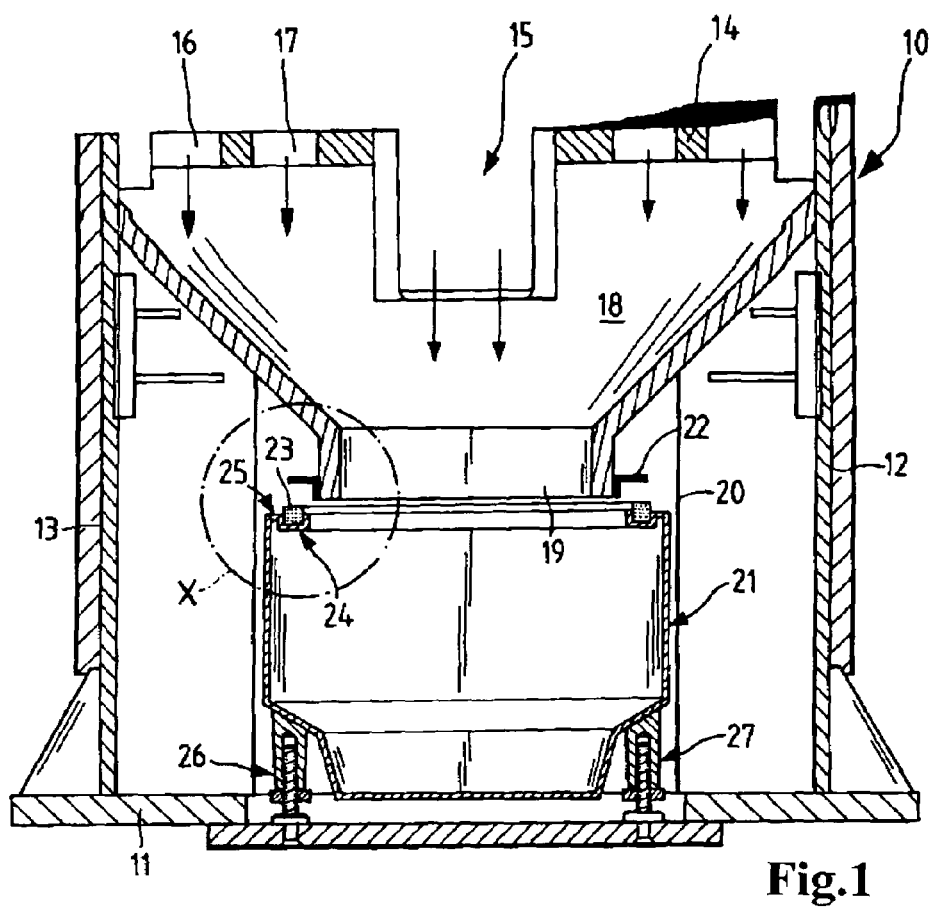
FIG. 1 is a schematic elevational view of the lower frame of a machine tool with a collecting trough according to the present invention.

As shown in FIG. 1, the lower frame 10 of the machine tool (shown only in part) has a base plate 11. Pedestals 12, 13 extending from the base plate support a worktable 14. Above this worktable, a machining process for the machining of workpieces by chip removal takes place. The coolant required in chip-removing machining flows downwardly through the interior opening 15. The coolant may also flow through openings 16, 17 of the worktable 14. The chips are removed together with the coolant and reach a collection funnel 18, which has a narrowed outlet 19.

Figure 1A:
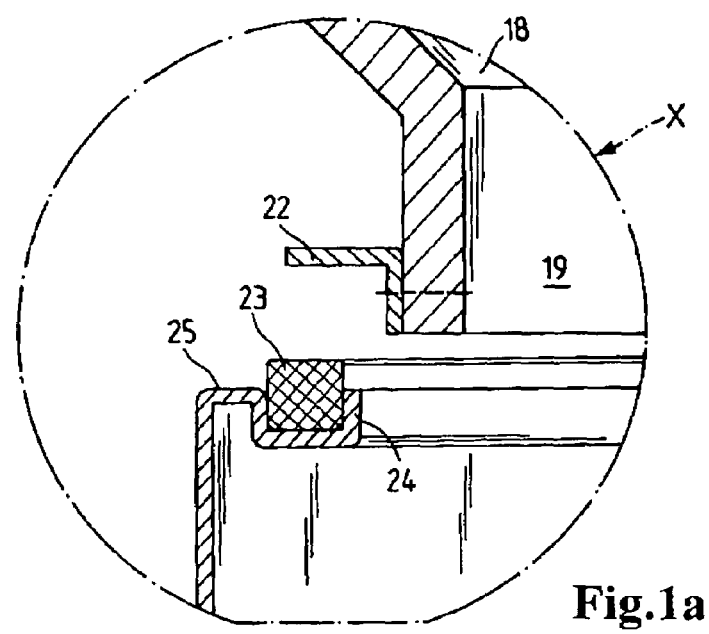
FIG. 1a is an enlarged detail of the area X of FIG. 1.

Underneath the outlet 19, a space 20 is provided to receive a collection trough 21. In the position illustrated in FIGS. 1 and 1a, the collection trough is not yet mated to the machine tool, but has an axial clearance relative to a sealing edge 22 in the form of a circumferential flange of sheet metal adjacent the outlet 19 of the machine tool. At the top edge of the collection trough, the trough itself carries a molded or shaped gasket 23 made of a foam seal material. This molded gasket is disposed in a frame 24 at the upper edge 25 of the collection trough.

Figure 2:
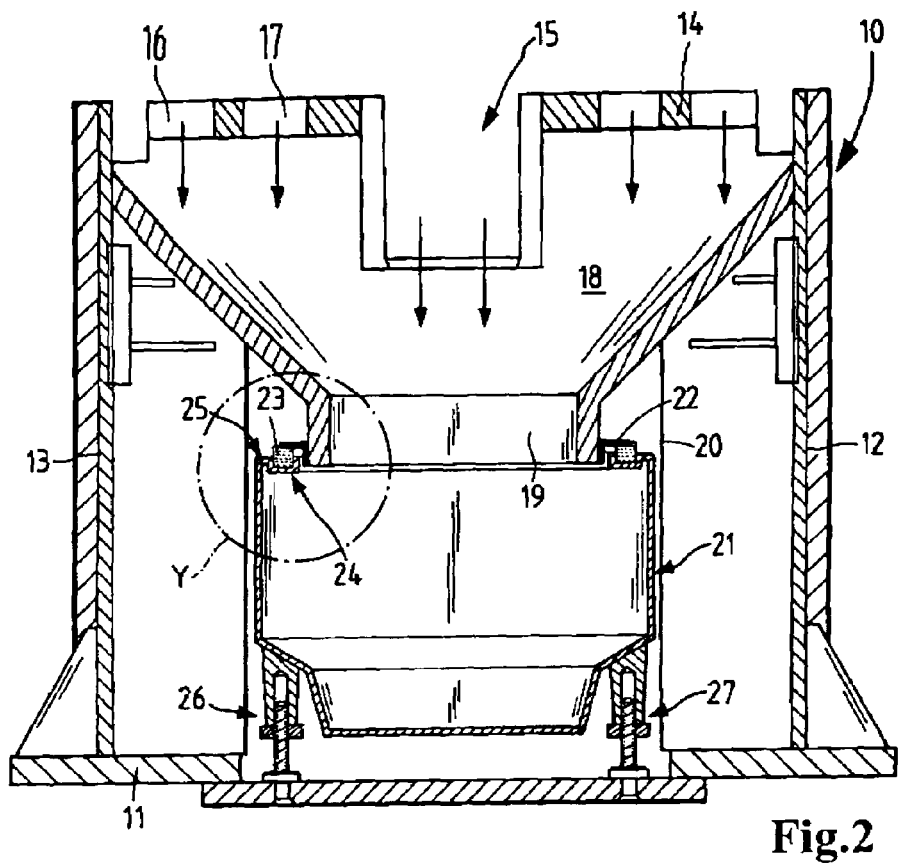
FIG. 2 is a view of the machine tool of FIG. 1 with the collecting trough moved into contact with the machine tool.
Figure 2A:
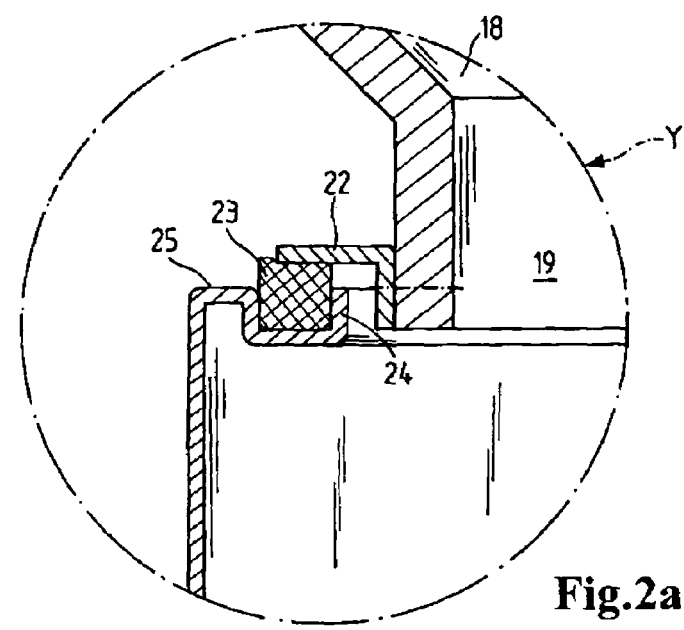
FIG. 2a is an enlarged detail of the area Y of FIG. 2.

The collection trough stands on height-adjustable feet or screw jacks 26 and 27. Alternatively, hydraulically or pneumatically extensible feet or other types of known jack mechanisms could also be used. To mate the collecting trough to the machine tool, the trough may be moved upwardly by adjusting the height of the feet to the position shown in FIG. 2. This causes the shaped gasket 23 to be seated against the sealing edge 22 and provides a reliable seal (see also FIG. 2a). In addition, the adjustment of the height of the collection trough elevates the level of its floor to facilitate proper discharge of coolant collected in the trough.

Figure 3:
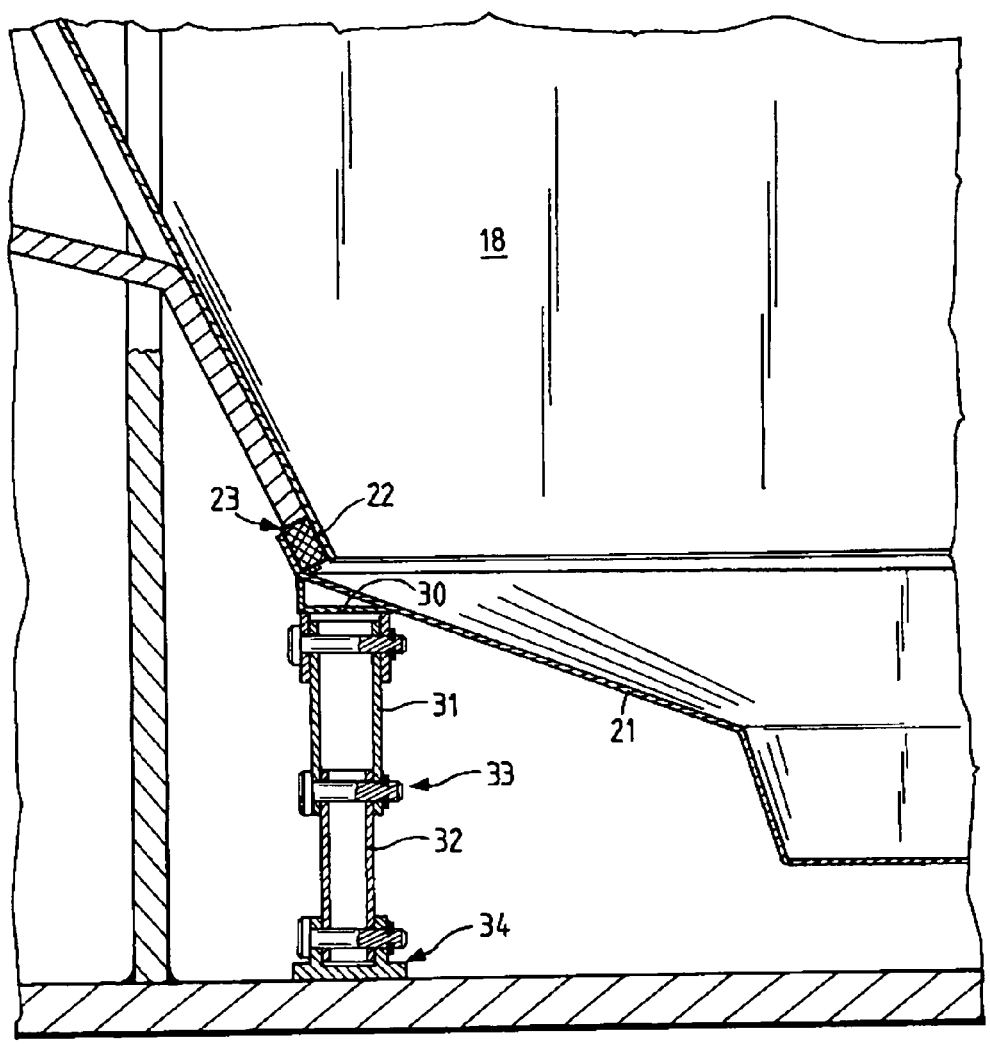
FIG. 3 is a detail representation of an alternate seal configuration and of a scissor mechanism for adjusting the height of the collecting trough and seal.

FIG. 3 is a detail view of a collection trough 21 with an alternate seal configuration and scissor-type height adjusting mechanism. On the collection trough, in the contact region relative to the sealing edge 22, the shaped or molded gasket 23 is seated on an L-shaped support section 30. This L-shaped support section is disposed on an upper articulated arm 31. The upper articulated arm is rotatably connected to a lower articulated arm 32. An interposed bearing 33 ensures mobility. The side shown here has two scissor feet of this type. A horizontal movement of the bearing 33 causes the feet or articulated arms 31, 32 to bend or stand upright.

At the bottom of the foot, a bearing shoe 34 is provided, which is also displaceably disposed on the lower articulated arm 32. This version has the advantage that, on the one hand, the collection trough position is exactly adapted to the sealing edge of the machine and, on the other hand, the overall height of the collection trough is low because of the folding action of the trough feet. Normally two pairs of feet are provided, but other arrangement are conceivable.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims.

What is claimed is:

1. A collecting trough for arrangement underneath a machine tool to collect coolant from the machine tool, wherein said collecting trough is open toward the top thereof and is provided with a height adjusting mechanism and has at least one seal member made of foam seal material arranged along a top edge at the side of the trough for contacting an undersurface of the machine tool and sealing gaps between the trough and the machine tool, wherein said at least one foam seal member engages a flat sealing surface formed by one leg of a sheet metal angle flange, the other leg of which is affixed to the machine tool.

2. A collecting trough according to claim 1, wherein the height adjusting mechanism is a mechanical mechanism and is arranged at the bottom of the collecting trough.

3. A collecting trough according to claim 1, wherein the collecting trough is moveably arranged underneath the machine tool so as to be removable from underneath the machine tool.

4. A collecting trough according to claim 1, wherein the foam seal material comprises a foamed nitrile rubber or butadiene rubber with a closed cell structure having a density in the range from 100 to 300 kg/m$^3$.

5. A collecting trough according to claim 4, wherein said foam seal material is water absorbent.

* * * * *